United States Patent Office 3,510,963
Patented May 12, 1970

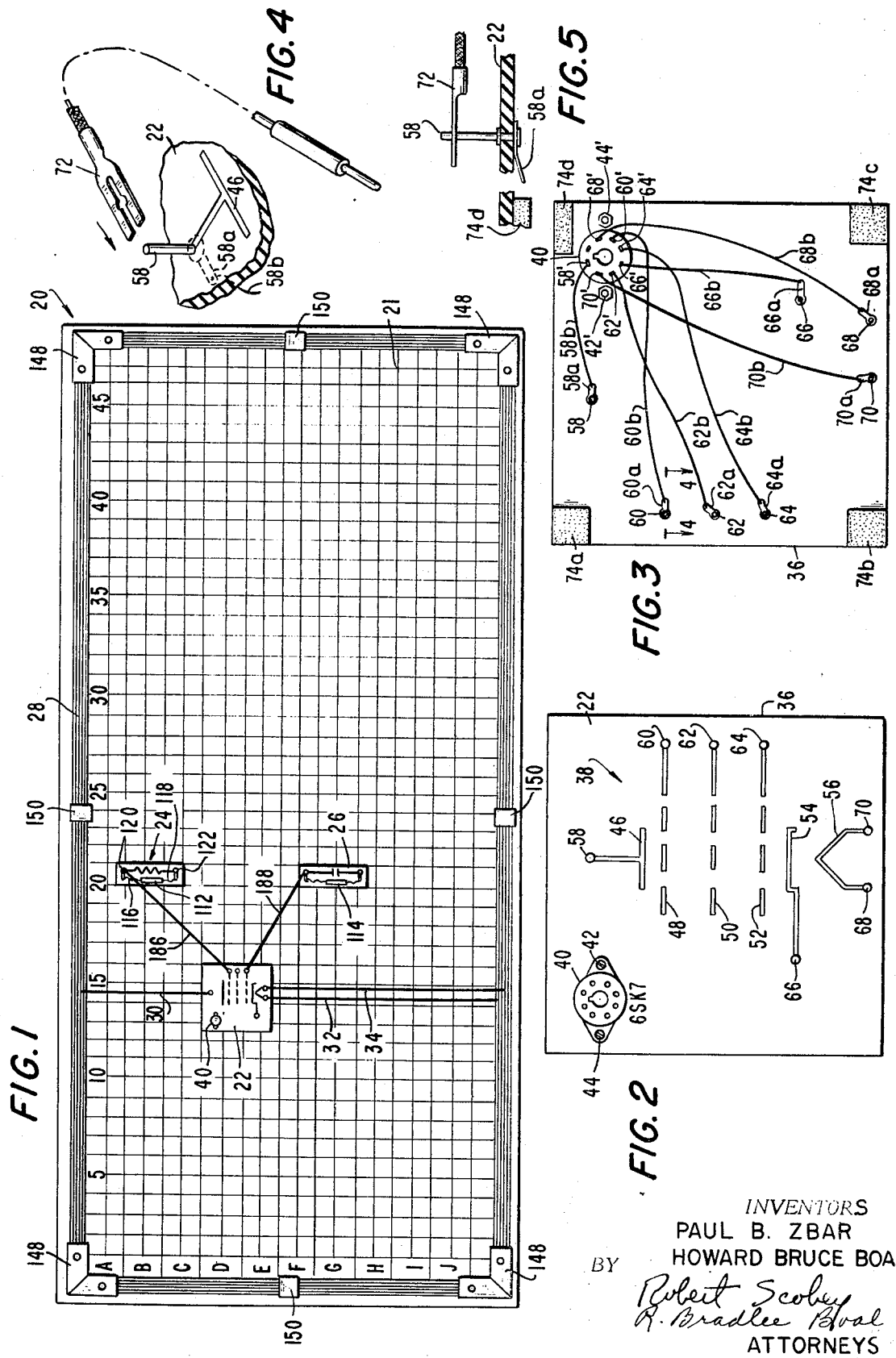

3,510,963
TEACHING SYSTEM
Paul B. Zbar, Great Neck, N.Y., and Howard Bruce Boal, Marblehead, Mass., assignors to Hickok Teaching Systems, Inc., Cambridge, Mass., a corporation of Ohio
Continuation of application Ser. No. 498,693, Oct. 20, 1965. This application Aug. 28, 1968, Ser. No. 757,221
Int. Cl. G09b 23/18; H02b 1/04
U.S. Cl. 35—19                                              8 Claims

ABSTRACT OF THE DISCLOSURE

Apparatus for demonstrating the operation of electrical and electronic circuits and systems comprised of a chalk board of ferromagnetic material with power distribution bars disposed about the periphery of the chalk board and provided with a plurality of connection points consisting of drill holes. Each circuit element is mounted on an exposed surface of a panel made of insulating material with the schematic of the circuit component drawn on the exposed surface of the panel. The panels are provided with mounting means such as magnetic material which permits location of the panels in any arbitrary position on the chalk board. Electrical connectors are provided to connect the circuit components with one another and with the sources of power. These connectors may be formed of stretchable leads so that the connectors appear as straight lines to the observer of the apparatus.

---

This application is a continuation of application 498,693, filed Oct. 20, 1965.

This invention relates generally to teaching systems. More particularly, it relates to apparatus useful in teaching the nature and operation of electrical and electronic circuits and systems in a classroom or laboratory.

In the past it has been difficult to demonstrate accurately and clearly the nature and operation of electrical and electronic circuits and systems with the equipment generally available. In some instances the equipment has not been adaptable to speedy assembly and disassembly to form the circuits to be illustrated. Furthermore, in a typical classroom the demonstration circuits have been set up on a horizontal surface at the front of a classroom so that it has been difficult for those seeking to observe the demonstration to see and appreciate the function and operation of a particular circuit. With such a set up, it has been typically necessary for the instructor to draw a schematic diagram of the circuit on the classroom chalk board in addition to setting up a demonstration circuit on a classroom table. With such an arrangement, the demonstration circuit and the schematic circuit diagram are not disposed adjacent to each other, and it has been difficult to explain the operation of the actual circuit with reference to the schematic circuit diagram. Still further, problems have arisen in the past stemming from the fact that voltage sources are typically available only at one particular location or locations, and accordingly the demonstration circuit had to be set up in close proximity thereto. The availability of voltage sources at such limited locations has often complicated the circuitry wherein a single voltage source, e.g., +250 D.C. is required at a multiplicity of points in the circuit.

It is the object of this invention to provide apparatus which may be used to clearly and accurately show the function and operation of electrical circuits and systems.

It is a further object of this invention to provide apparatus for demonstrating electrical circuits which readily and easily may be assembled and disassembled.

It is another object of this invention to provide apparatus to be used in a classroom or laboratory for demonstrating electrical circuits which may be viewed easily by a large number of students.

It is still another object of the invention to provide apparatus for demonstrating and illustrating electrical circuits, employing a classroom chalk board.

A further object of the invention is to provide demonstration apparatus in which voltage sources and signals are available at a multiplicity of locations.

According to the present invention, a typical classroom chalk board made of steel or other ferromagnetic material is utilized. Disposed along the periphery of the chalk board is a power distribution system comprised of electrically conductive bars separated from one another by insulation. Each bar carries a signal differing from that carried by any other bar and each bar may be colorcoded to indicate the signal carried by the bar. For example, one bar may provide B+ voltage, another bar may be at ground potential. Each of the power distribution bars is provided with a plurality of connection points for connection to the appropriate terminals of the circuit to be illustrated. Advantageously, the connection points are provided by holes drilled into the bars, for receiving corresponding plugs attached to conductors. Such bars with holes are a much simpler and less expensive arrangement than "banana jacks" wired together. Electrical circuit devices are mounted on rigid panels, each of which has printed thereon the schematic circuit diagram of the device on the panel. The panels are provided with magnetic material on the undersides thereof for detachably securing the panels to the chalk board. The electrical terminal connection of each circuit device are connected to terminals adjacent to the schematic circuit diagram on the associated panel. In this fashion electrical connection is made to each device by attachment to a terminal at a corresponding point on the schematic circuit diagram, thus enabling the student to visualize the actual circuit connection in terms of the schematic circuit diagram. With the apparatus as described, a complex circuit may be easily set up on a vertically disposed chalk board employing panels containing the components of the circuit. The circuit is visible to all students. The electrical device on each panel may be a single component, such as a vacuum tube, a resistor, or conductor or the device may be an operative circuit such as an amplifier or a more complex or multi-circuit device such as a multivibrator. In any event, circuit devices are easily arranged on the chalk board in any physical relationship desired to aid in the teaching of the particular system demonstrated. Power connections to the various devices may be easily made by suitable connection to the power distribution system along the periphery of the chalk board. By utilizing stretchable leads for power connections and for connections from one panel to another, such connections are in the form of straight line conductors which appear to the student as straight lines on a schematic diagram, further rendering the actual circuit like a schematic circuit diagram.

A more complete understanding of the invention may be obtained by reference to the following detailed description.

In the drawings:

FIG. 1 is a front view of a representative system for teaching the nature and operation of electrical circuits in accordance with the invention.

FIG. 2 is a top view of a representative panel mounting an electrical device in accordance with the invention in the system of FIG. 1.

FIG. 3 is a bottom view of the panel of FIG. 2.

FIG. 4 is a fragmentary perspective view of a portion of the panel of FIG. 2, to an enlarged scale, also showing an electrical conductor for making electrical connection to a terminal on the panel segment.

FIG. 5 is a sectional view showing in more detail the terminal connection to the panel segment shown in FIG. 4.

Figure 8:
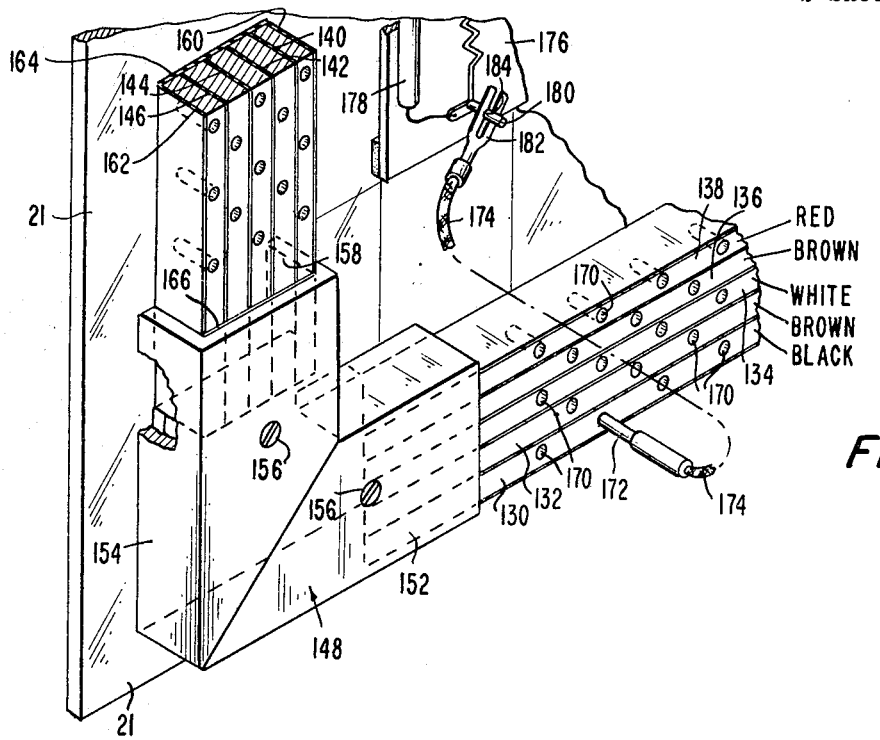
FIG. 8 is an enlarged view of a portion of the system shown in FIG. 1, illustrating the details of a power distribution system in accordance with the invention.

Referring to FIG. 1, a system 20 for teaching the nature and operation of electrical circuits is shown. Typically a chalk board 21 of ferromagnetic material, such as steel, is employed as a mounting board for electrical circuit devices. As employed herein, the term "electrical circuit device" is intended to mean a single electrical component, e.g., a vacuum tube, or a plurality of components, e.g., a capacitor, a resistor and diode which may or may not be connected to form an operative circuit, e.g., a clamping circuit.

In FIG. 1 three panels 22, 24 and 26 are shown, each of which carries an electrical circuit device thereon. The panels are adapted to be magnetically secured to the mounting board by magnetic elements attached to the undersides of the panels, as described in more detail below. A power distribution system 28 extends along the periphery of the chalk board 21 and provides power for the electrical circuit devices on the panels mounted on the chalk board. Power is derived from the distribution system 28 such as by electrical conductors 30, 32 and 34, and is available at all points on the board 21.

Referring now to FIG. 2, the panel 22 of FIG. 1 is shown in more detail. This typically comprises a sheet 36 of rigid insulating material, such as fiberboard, on the front surface of which is depicted a schematic circuit diagram 38 of the electrical circuit device carried on the panel. For the purpose of illustration a vacuum tube (type 6SK7) is mounted on the panel. The actual tube has not been illustrated in FIG. 2; instead base 40 for receiving the tube is shown. Typically, the tube base is secured to the panel by screws 42 and 44, maintained in place by nuts 42' and 44' (FIG. 3). As is known, the 6SK7 vacuum tube is a triple grid tube normally used in amplifiers. Thus the schematic circuit diagram 38 depicted on the front face of the panel includes symbol 46 representing the plate of the tube, symbols 48, 50 and 52 representing the three grids of the tube, symbol 54 representing the cathode of the tube and symbol 56 representing the filament or heater of the tube.

Circuit terminals are provided on the panel adjacent to particular symbols on the schematic circuit diagram 38. In particular, terminal 58 is attached to the panel adjacent to the plate symbol 46 and serves to make electrical connection to the plate of the 6SK7 tube mounted in the tube base 40 as will be explained below.

Referring to FIGS. 4 and 5, terminal 58 is shown in more detail, and typically comprises a pin secured to the panel and which extends both above the front face of the panel to receive an electrical connector 72 and through the panel to receive a connector 58a on the bottom or rear face of the panel.

Referring to FIG. 3, which illustrates the bottom face of the panel 22, the connector 58a is connected by conductor 58b to connecting terminal 58' on the tube base 40. The terminal 58' is electrically connected to the plate of the 6SK7 tube when the tube is mounted in the base 40.

In similar fashion, grid connecting terminals 60, 62 and 64 are mounted on the front face of the panel 22 at points adjacent to the printed grid symbols 48, 50 and 52, respectively. These three terminals are connected respectively by conductors 60b, 62b and 64b to associated tube base terminals 60', 62' and 64' which are connected to the three grids in the 6SK7 tube when the tube is mounted in the tube base 40. In like fashion cathode terminal 66 is positioned on the front face of the mounting panel 22 adjacent to the cathode symbol 54, and filament connection terminals 68 and 70 are mounted on the panel adjacent to the filament symbol 56. As shown in FIG. 3 the terminals 66, 68 and 70 are connected by associated conductors 66b, 68b and 70b respectively to cathode connection terminal 66', 68' and 70' of the tube base 40. One or more of the printed symbols may be omitted from the face of the panel if desired for simplicity, such as the filament symbol 56.

It will be noted from FIGS. 2 and 3 that electrical connection to the 6SK7 tube mounted on the panel 22 is made on the front of the panel to the corresponding terminals on the schematic circuit diagram. The actual wiring from these terminals to the tube itself is done behind the panel on the rear face thereof, as shown in FIG. 3. By providing electrical connections to the circuit device at points on the schematic circuit diagram, the student may visualize the connections being made in terms of the schematic circuit diagram to aid greatly in the understanding of the circuit. By keeping out of sight the wiring from the terminals to the electrical circuit device, the student is not confused by a number of wires on the front of the panel.

As shown in FIG. 3, the panel 22 includes magnetic elements 74a, 74b, 74c and 74d secured to the bottom or rear side of the panel. These elements are for the purpose of mounting the panel 22 on the ferromagnetic chalk board 21 of FIG. 1. With this arrangement, the panel 22 may be positioned in any location on the chalk board, thereby rendering the system very flexible. In particular, any number of circuits may be built from a basic group of panels each containing a circuit device thereon. The panels may be positioned anywhere on the chalk board so that the student may best visualize the circuit in terms of the schematic diagram of the overall circuit, which is formed by the individual diagrams imprinted on each of the panels.

Figure 6:
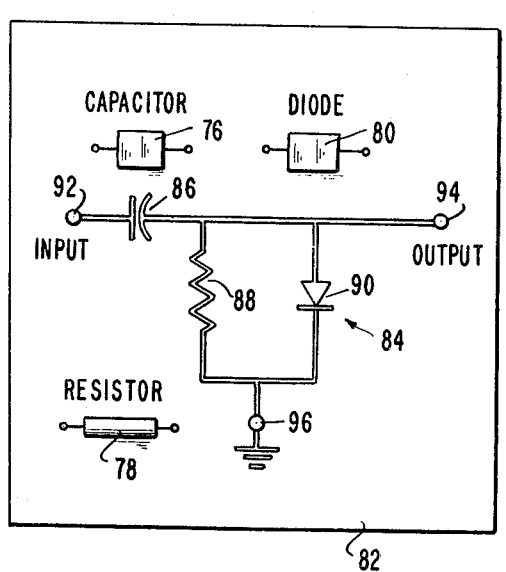
FIG. 6 is a top view of another panel mounting an electrical circuit device in accordance with the invention in the system of FIG. 1.
Figure 7:
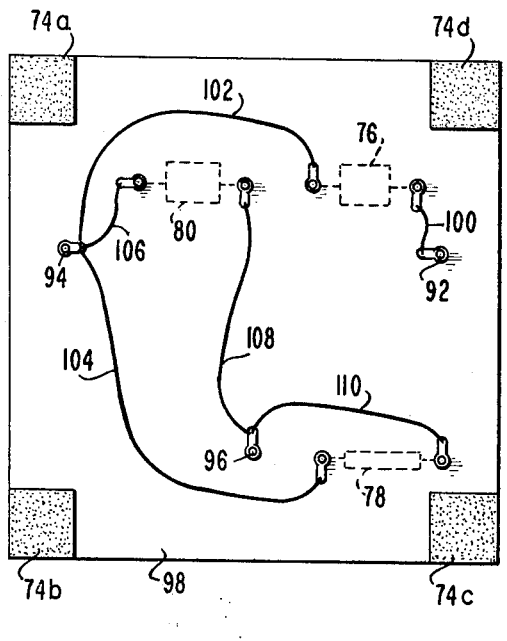
FIG. 7 is a bottom view of the panel of FIG. 6.

As was noted above, the electrical circuit device mounted on each panel may be a single component, e.g., the 6SK7 vacuum tube shown for the panel of FIG. 2, or it may be a plurality of components, such as shown in FIG. 6. FIG. 6 illustrates a typical clamping circuit formed from a capacitor 76, a resistor 78 and a diode 80. These components are mounted on front face 82 of the panel as shown, and are represented in schematic circuit diagram 84 by capacitor symbol 86, resistor symbol 88 and diode symbol 90. Input terminal 92, output terminal 94 and ground terminal 96 are provided directly on the schematic circuit diagram. These terminals are connected on rear face 98 of the panel (FIG. 7) by conductors 100, 102, 104, 106, 108 and 110 to the actual circuit elements, i.e., the capacitor 76, the resistor 78 and the diode 80 to complete the circuit connections shown in the schematic circuit diagram 84.

In the case of a circuit device which requires a number of wires to complete the connections from the terminals on the panel to the device, it is generally advisable to place these connections on the bottom face of the panel (FIGS. 3 and 7) to avoid confusing the student, as noted above. However, it may be desirable in some cases to place connecting wires on the front face of the panel. This is illustrated in FIG. 1 for the panels 24 and 26 which respectively carry a resistor 112 and a capacitor 114. For example, referring to the resistor panel 24, conductors 116 and 118 connecting the resistor to terminals 120 and 122 are positioned on the front face of the panel 24. In this instance the conductors 116 and 118 should not confuse the student in the demonstration of the circuit.

Referring to FIGS. 1 and 8 together, the details of the power distribution system 28 for supplying power to the panels mounted on the chalk board 22 are shown. The power distribution system comprises a plurality of electrically conductive bars 130, 132, 134, 136 and 138. The bars are electrically insulated from each other by strips of insulating material, which may be insulating tape, as designated 140, 142, 144 and 146. In FIG. 8 five conductive bars are shown; however, the number is completely arbitrary. The bars as shown in FIG. 1 extend about the entire periphery of the chalk board; if desired, the bars need only extend partly around the chalk board. The conductive bars are retained on the chalk board 21 by corner clamps 148 and midsection clamps 150.

Each corner clamp 148 (FIG. 8) comprises two sections 152 and 154, each of which is secured to the chalk board 21 by a screw 156 or similar fastening. The slamp sections 152 and 154 are U-shaped, as at 158, to receive the ends of the bars 130–138. Strips of insulating material 160 and 162 insulate the bars 130–138 from the corner clamps, which may be of electrically conductive material such as aluminum. Insulating strip 164 is included on the undersides of the bars to insulate the bars from the chalk board 21. Similarly, a strip 166 of insulating material is included to insulate the outside faces of the bars from the adjacent surface of each corner clamp 148.

The conductive bars are advantageously painted with different colors to designate the voltages and signals carried thereby. In the embodiment shown in FIG. 8 the bar 130 is colored black, the bars 132 and 136 are colored brown, the bar 134 is colored white and the bar 138 is colored red. As an example, only the red bar 138 may carry B+ potential, the brown bars 132 and 136 may carry an AC signal, e.g., 6.3 volts filament potential, the black bar 130 may be at ground potential and the white bar 134 may be at a negative grid biasing potential.

Each of the bars 130–138 includes a plurality of holes 170 thereon. Typically, the holes are formed by drilling; however, the bars with the holes may be manufactured in any convenient fashion. Each hole is adapted to receive a plug 172 at the end of a conductor 174. One of the plugs in a hole in each bar may be connected to a suitable potential source (not shown) to establish the potential of the bar. The other plugs in each bar are adapted to be connected to the panels on the chalk board 21 to provide power to the electrical circuit devices on the panels. As shown in FIG. 8, a fragment of a panel 176 is shown carrying a resistor 178 thereon. Pin-type terminal 180 is connected to the resistor, and is positioned adjacent to the schematic diagram of the resistor. Pin 180 is contacted by U-shaped connector 182 which typically includes a U-shaped cut-away portion 184 on each of its legs to retain the connector in place on the pin.

Referring to FIG. 1, conductors 30, 32 and 34 are shown connecting the terminals of the tube panel 22 to the power supply system. Conductors 186 and 188 are shown connecting two grid terminals on this panel to terminals on the resistor panel 24 and the capacitor panel 26. Each of these conductors advantageously may be a stretchable conductor so that it is always taut and in a straight line when making a connection between two terminals. In this fashion all electrical leads completing circuit connections may be in straight lines and the directions of the lines may be established by suitable positioning of the panels on the chalk board so that the connecting conductors follow the same paths as do the straight lines on a schematic circuit diagram of the overall circuit formed by the circuit devices of the panels on the chalk board. In this fashion the physical circuit that is constructed may be made to look exactly like a schematic circuit diagram without requiring the instructor to draw upon the chalk board. Hence, the fabrication of circuits and the preparation of schematic circuit diagrams is greatly facilitated by the present invention.

It should be noted that the power distribution system with its bars and holes therein is a simple but highly effective apparatus for making power available throughout the entire area of the chalk board 21. The hole mechanism is much easier and cheaper to fabricate than a series of "banana jacks" interconnected by wires, e.g., as has been done in the past.

The chalk board 21 may be fastened to a wall or it may be portable by suitable attachment to a portable stand (not shown). Further, by providing a chalk board as the mounting board for the panels, the instructor may mark the board with suitable notations in chalk to further explain the circuit and to complete the lesson.

The term "electrical" is used herein a broad sense and is intended to include that pertaining to electronics. The term "circuit" as used herein is also used in a broad sense and is intended to include simple devices such as conductors or resistors as well as relatively complex devices or systems such as multivibrators or amplifiers.

A representative embodiment of the invention has been described above. The scope of the invention, however, is defined by the following claims:

We claim:
1. Electrical teaching apparatus, comprising:
 (A) a plurality of panels;
 (B) an electrical circuit device mounted on an exposed surface of each of said panels and having electrical terminal connections on said exposed panel surfaces;
 (C) a schematic circuit diagram on each of said panels illustrating the electrical circuit device mounted on the panel;
 (D) mounting board means;
 (E) mounting means electrically independent of the electric circuit devices for detachably mounting said panels on said mounting board means at arbitrary locations thereon;
 (F) circuit terminals on each of said panels adjacent to points of connection illustrated by the schematic circuit diagram on the panel, each of said circuit terminals on a panel corresponding to an indivdual one of said terminal connections of the electrical circuit device on the panel;
 (G) electrical conductor means connecting the circuit terminals on each panel to the corresponding ones of said terminal connections of the electrical circuit device on the panel;
 (H) electrical power distribution means attached to said mounting board means;
 (I) means for connecting a plurality of said circuit terminals to said electrical power distribution means;
 (J) said electrical power distribution means comprising a plurality of bars of electrically conductive material each at an individual electrical potential; and
 (K) means for insulating the conductive bars from one another and from the mounting board means.

2. Electrical teaching apparatus as recited in claim 1, wherein said means for connecting said plurality of circuit terminals to said electrical power distribution means includes a plurality of electrical conductors each having a plug at an end thereof, and each of said electrically conductive bars includes a plurality of holes therein into any one of which a plug may be inserted.

3. Electrical teaching apparatus as recited in claim 2, wherein each of said electrical conductors comprises a stretchable conductive lead.

4. Electrical teaching apparatus, comprising:
 (A) a plurality of panels each having an exposed front and a hidden rear face;
 (B) an electrical circuitd evice mounted on the exposed front face of said panels and having electrical terminal connections thereto;
 (C) a schematic circuit diagram on the front face of each of said panels illustrating the electrical circuit device mounted on the panel;
 (D) circuit terminals on the front face of each of said panels adjacent to points of connections illustrated by the schematic circuit diagram on the panel, each of the circuit terminals on a panel corresponding to an individual one of the terminal connections of the electrical circuit device on the panel;

(E) electrical conductor means connecting the circuit terminals on each panel to the corresponding ones of the terminal connections of the electrical circuit device on the panel said electrical conductor means being disposed on the rear of the panel;

(F) mounting board means;

(G) mounting means electrically independent of the electric circuit device for detachably mounting said panels on said mounting board means at arbitrary locations thereon;

(H) electrical power distribution means along the periphery of said mounting board means, comprising a plurality of bars of electrically conductive material each at an individual electrical potential and each including a plurality of holes therein;

(I) a plurality of first electrical conductors each attached at one end thereof to an individual one of said circuit terminals and each having a plug at the other end thereof insertable into one of said holes in one of said bars; and (J) a plurality of second electrical conductors interconnecting circuit terminals on said panels.

5. Electrical teaching apparatus as recited in claim 4, wherein said mounting board means comprises a sheet of ferromagnetic material, and said mounting means comprises at least one magnetic element attached to the rear face of each of said panels for magnetically securing said panels to said ferrogmagnetic sheet at arbitrary locations thereon.

6. Electrical teaching apparatus as recited in claim 4, wherein said bars of electrically conducting material extend about the entire periphery of the mounting board means, and further include strips of insulating material insulating said bars from each other and from said mounting board means.

7. Electrical teaching apparatus, comprising:

(A) a plurality of panels;

(B) an electrical circuit device mounted on an exposed surface of each of said panels and having electrical terminal connections on said exposed panel surface;

(C) a schematic circuit diagram on each of said panels illustrating the electrical circuit device mounted on the panel;

(D) mounting board means of ferromagnetic material;

(E) magnetic mounting means attached to the rear face of each of said panels for detachably mounting said panels on said mounting board means at arbitrary locations thereon;

(F) circuit terminals on each of said panels adjacent to points of connection illustrated by the schematic circuit diagram on the panel, each of said circuit terminals on a panel corresponding to an individual one of said terminal connections of the electrical circuit device on the panel;

(G) electrical conductor means connecting the circuit terminals on each panel to the corresponding ones of said terminal connections of the electrical circuit device on the panel;

(H) means for supplying electrical power to the circuit device; and (I) means for connecting a plurality of said circuit terminals to said electrical power supplying means.

8. Electrical teaching apparatus comprising:

(A) a mounting board of ferromagnetic material having a flat exposed surface;

(B) a plurality of panels of electrically non-conductive material having front and rear surfaces;

(C) an electrical circuit device mounted on the front surface of each panel and having electrical terminal connections on said front surface;

(D) mounting means electrically independent of the electrical circuit device affixed to the rear surface of each panel for detachably mounting the panel on the exposed surface of the mounting board comprising at least one magnetic element affixed to the rear surface of the panel for magnetically securing the panel to the mounting board so as to permit the panel to be slidably adjusted to any arbitrary position on the mounting board;

(E) a schematic diagram of the electrical circuit device disposed on the front surface of each panel;

(F) said electrical terminal connections being disposed on the front surface of the panel adjacent to points of connection illustrated by the schematic circuit diagram;

(G) electrical conductor means connecting the circuit terminals on each panel to the corresponding ones of said terminal connections of the electrical circuit device on the panel; and (H) means for supplying electrical power to a plurality of circuit terminals.

References Cited

UNITED STATES PATENTS

| | | |
|---|---|---|
| 2,374,800 | 5/1945 | Bohlke. |
| 2,568,535 | 9/1951 | Ballard. |
| 2,643,466 | 6/1953 | Bucher. |
| 2,941,314 | 6/1960 | Schwieger _____ 35—7 X |
| 3,277,589 | 10/1966 | Berdan et al. |
| 2,592,552 | 4/1952 | De Florez. |
| 3,011,269 | 12/1961 | Thompson. |
| 2,878,587 | 3/1959 | Jubenville _____ 35—19 |
| 3,038,139 | 6/1962 | Bonanno _____ 339—12 |

FOREIGN PATENTS

| | | |
|---|---|---|
| 123,170 | 2/1919 | Great Britain. |
| 916,838 | 1/1963 | Great Britain. |
| 555,433 | 1/1957 | Italy. |

OTHER REFERENCES

Charles Mayer Studios Publication, rec'd Oct. 14, 1965, "Rubber Magnet," and "Hook N'Loop Products," price list.

"Solderless Breadboard System," article in Electronic Design Magazine, March 1955 issue, pp. 50–51.

EUGENE R. CAPOZIO, Primary Examiner

H. S. SKOGQUIST, Assistant Examiner

U.S. Cl. X.R.

317—101; 339—12